(12) United States Patent
Bernardo et al.

(10) Patent No.: US 10,137,766 B2
(45) Date of Patent: Nov. 27, 2018

(54) RETRACTABLE TRUCK BED COVER HAVING SLAT ARRAY WITH FLEXIBLE JOINER MEMBERS AND SHIELDED SEAMS

(71) Applicant: ROLL-N-LOCK CORPORATION, Pompano Beach, FL (US)

(72) Inventors: Richard Gregory Bernardo, Pompano Beach, FL (US); Brandon Gregory Bernardo, Pompano Beach, FL (US)

(73) Assignee: ROLL-N-LOCK CORPORATION, Pompano Beach, FL (US)

(*) Notice: Subject to any disclaimer, the term of this patent is extended or adjusted under 35 U.S.C. 154(b) by 8 days.

(21) Appl. No.: 15/213,180

(22) Filed: Jul. 18, 2016

(65) Prior Publication Data

US 2017/0008382 A1 Jan. 12, 2017

Related U.S. Application Data

(63) Continuation of application No. 14/450,616, filed on Aug. 4, 2014, now Pat. No. 9,399,391.

(51) Int. Cl.
*B60J 7/04* (2006.01)
*B60J 7/08* (2006.01)
*B60J 7/19* (2006.01)
*B60J 10/277* (2016.01)

(52) U.S. Cl.
CPC ............ *B60J 7/041* (2013.01); *B60J 7/085* (2013.01); *B60J 7/196* (2013.01); *B60J 10/277* (2016.02)

(58) Field of Classification Search
CPC . B60J 7/041; B60J 10/277; B60J 7/196; B60J 7/085
USPC ..................... 296/98, 100.09, 37.6
See application file for complete search history.

(56) References Cited

U.S. PATENT DOCUMENTS

| 3,148,724 A | 9/1964 | Chieger et al. |
| 4,793,397 A | 12/1988 | Whiteman |
| 5,251,950 A | 10/1993 | Bernardo |
| 5,330,246 A * | 7/1994 | Bernardo ............... B60J 7/068 160/130 |
| 5,540,475 A | 7/1996 | Kersting |

(Continued)

FOREIGN PATENT DOCUMENTS

| DE | 2 729 235 A1 | 1/1979 |
| FR | 2 781 249 A1 | 1/2000 |

(Continued)

*Primary Examiner* — Jason S Morrow
*Assistant Examiner* — E Turner Hicks
(74) *Attorney, Agent, or Firm* — Knobbe, Martens, Olson & Bear, LLP

(57) ABSTRACT

A retractable truck bed cover having an array of parallel aluminum slats joined together by connective hinges including leading and trailing edge configuration for improving the security of the cover by covering and concealing the seam between adjacent slats while improving the connective hinge's resistance to the effects of aging and/or exposure to temperature fluctuations. The truck bed cover connective hinge slat is designed to be in an array of discrete slats, which are joined to one another by means of joiner members secured at each end to slat end caps. The distal ends of the joiner members are attached to slat end caps at the distal ends of the slats, thereby preventing the joiner members from shrinking in relationship to the slats due to aging and/or exposure to temperature fluctuations.

18 Claims, 3 Drawing Sheets

(56) References Cited

U.S. PATENT DOCUMENTS

| | | | |
|---|---|---|---|
| 5,782,282 A | | 7/1998 | Chen |
| 5,984,379 A | | 11/1999 | Michel et al. |
| 6,076,881 A | | 6/2000 | Tucker |
| 6,113,176 A | | 9/2000 | Bernardo |
| 6,276,735 B1 | * | 8/2001 | Champion ............... B60J 7/041 296/100.06 |
| 7,258,387 B2 | | 8/2007 | Weldy |
| 7,334,830 B2 | | 2/2008 | Weldy |
| 7,513,543 B2 | | 4/2009 | Erskine |
| 7,628,442 B1 | | 12/2009 | Spencer et al. |
| 7,823,957 B2 | | 2/2010 | Williamson |
| 7,905,536 B2 | | 3/2011 | Yue |
| 8,146,982 B2 | | 4/2012 | Williamson et al. |
| 8,474,896 B2 | * | 7/2013 | Ostberg ............. B62D 33/0273 296/100.02 |
| 8,480,154 B2 | | 7/2013 | Yue |
| 8,678,459 B1 | | 3/2014 | Win |
| 9,834,076 B2 | * | 12/2017 | Rohr ...................... B60J 7/1621 |
| 9,840,135 B2 | | 12/2017 | Rusher et al. |
| 2003/0057726 A1 | | 3/2003 | Wheatley |
| 2006/0208524 A1 | | 9/2006 | Brown et al. |
| 2008/0231073 A1 | | 9/2008 | Essig |
| 2010/0270824 A1 | | 10/2010 | Yue |
| 2013/0093206 A1 | * | 4/2013 | Rusher ..................... B60P 7/02 296/100.14 |
| 2013/0341956 A1 | | 12/2013 | Garska |
| 2015/0054300 A1 | | 2/2015 | Shi et al. |

FOREIGN PATENT DOCUMENTS

| | | |
|---|---|---|
| WO | WO 1994/01298 | 1/1994 |
| WO | WO 2016/022164 | 2/2016 |

\* cited by examiner

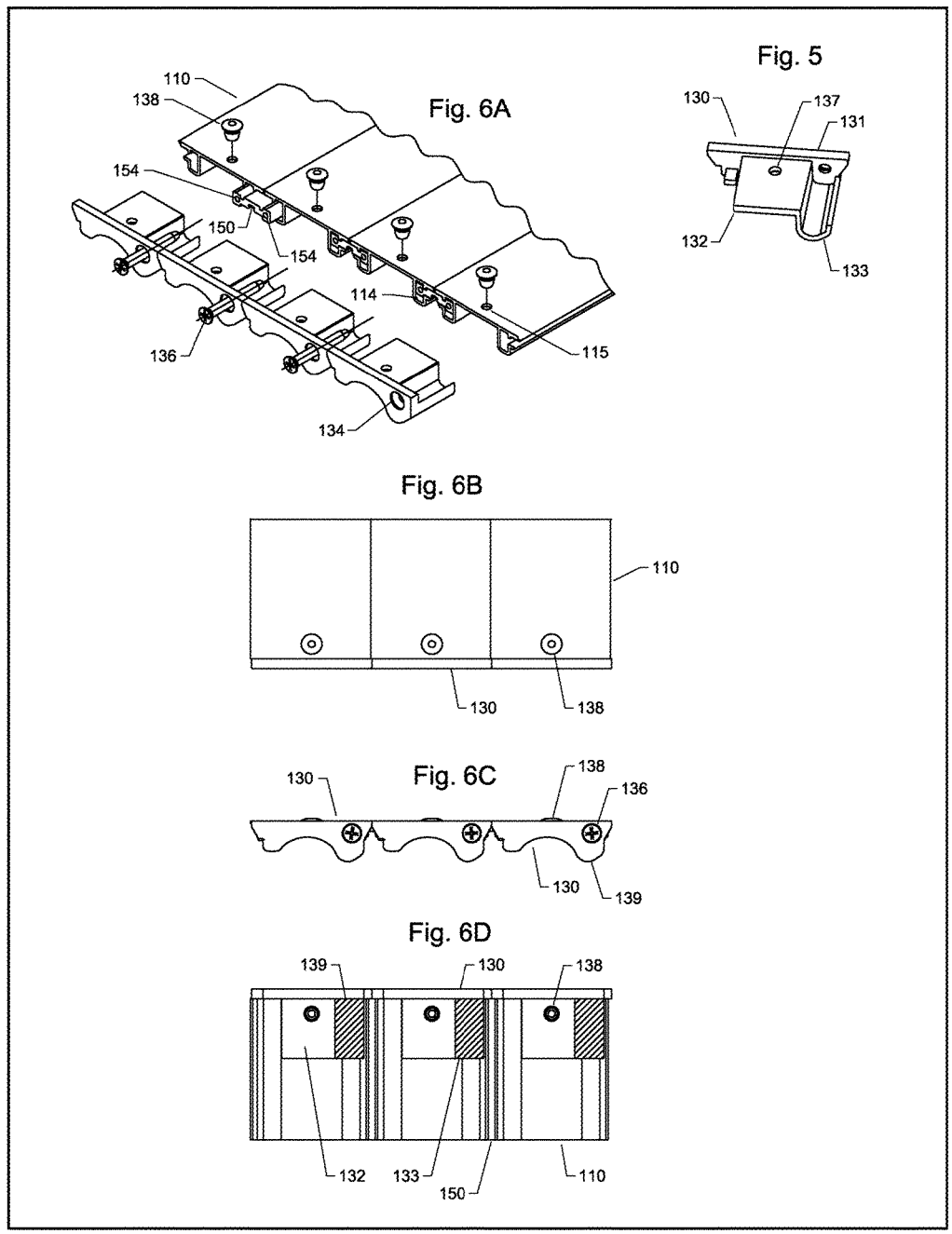

RETRACTABLE TRUCK BED COVER HAVING SLAT ARRAY WITH FLEXIBLE JOINER MEMBERS AND SHIELDED SEAMS

CROSS-REFERENCE TO RELATED APPLICATIONS

Applicant hereby incorporates by reference the disclosures of Applicant's U.S. Pat. No. 5,252,950, entitled "Rolling cover for a truck utility bed having improved reel support housing and guide track clamps," U.S. Pat. No. 5,330,246, entitled "Slat block and guide track apparatus for rolling truck bed cover," and U.S. Pat. No. 6,113,176, entitled "Slat house hinge for laminated retractable truck bed cover."

STATEMENT REGARDING FEDERALLY SPONSORED RESEARCH OR DEVELOPMENT

N/A

BACKGROUND OF THE INVENTION

Field of the Invention

This invention relates generally to a retractable truck bed cover made up of an array of parallel aluminum slats joined together along each slat's leading and trailing edges for water integrity, security and flexibility.

Description of the Prior Art

The design and use of retractable truck bed covers with open bed pickup trucks to provide security and protection for cargo items carried within the truck bed is well known. Conventional retractable truck bed covers commonly include a plurality of individual slats hingedly connected to form a slat array. The hinged connection of individual slats enables the slat array to form a continuous cover that, once mounted in a pair of side rails, can be moved from a first flat position covering the truck bed to a second stored position where the cover is retracted (rolled up) on a reel or spindle in a housing.

One type of slat array design for conventional retractable truck bed covers is defined by rigid individual slats, generally extruded or formed aluminum, which are arranged together along their edges such that their edges are overlapped and covered with a pliable, continuous surface material laminate. In this laminated slat array design, the individual slats overlap, engaging one another in an interlocking joint, while the laminate surface material functions to secure the overlapping slats together, to form an articulating cover body.

Another type of slat array design for conventional retractable truck bed covers is defined by rigid slats joined together along their edges with connective hinge bodies such that they are immediately contiguous to one another with adjacent slats fastened together without overlapping. For this connective hinge slat array design, flexible joiner members are commonly utilized as connective hinge bodies to attach adjacent individual slats by engaging and extending (or bridging) between receptor channels disposed in the opposing edges of the adjacent slats. In this regard, the joiner members are operative to both attach the slats together and enable the desired hinging movement between adjacent slats because of their flexibility. The joiner members also function as the water seal or gasket between the contiguous slats and therefore, to function effectively, must be continuous from end to end (along the entire length) of the contiguous slats.

While this connective hinge type of slat array design provides some manufacturing efficiencies, it is also subject to some well-known weaknesses and vulnerabilities. One such weakness comes from the ease in which the individual slats can be separated. Because the individual slats are arranged so that they do not overlap when joined together and are not covered by a laminate surface material, the seam between individual slats remains exposed. If a box cutter, razor knife, or other blade is simply inserted into and run along the exposed seam between contiguous slats, the joiner member can be cut, thereby detaching the contiguous slats and breaching the security of the cover. Another vulnerability relates to the tendency for the joiner member, which are typically extruded silicon, to contract over time due to aging and/or exposure to temperature fluctuations. This shrinkage often results in the joiner members no longer extending from end to end of contiguous slats, leaving the end portions of such contiguous slats that make up the slatted array with exposed spaces between the slats and compromising the water tightness of the cover body.

Accordingly, there remains a need for a modified retractable truck bed cover design which would eliminate exposed seam security vulnerability of conventional connective hinge style slats when placed in a slat array. It would be helpful if such a modified truck bed cover slat was able to protect the joiner member connecting adjacent slats in an array without requiring a restrictive overlap or interlock between adjacent slats. It would be additionally desirable for such a modified truck bed cover slat to overcome the problem of joiner member shrinkage and the associated issue of water penetration.

The Applicant's invention described herein provides for an improved retractable truck bed cover slat with connective hinge style slats arranged in a slat array that employs a means to address the shortcomings of prior art designs by protecting the attaching joiner member between contiguous slats while also preventing the joiner member from shrinking and contracting. The primary components of Applicant's modified truck bed cover slat are an aluminum base slat, a silicon joiner member, and a molded slat end cap. When in operation, the modified truck bed cover slat allows the assembly of a slat array which improves the security provided by conventional connective hinge slatted truck bed covers and addresses other limitations or shortcomings imposed by the conventional slat structures in the prior art.

SUMMARY OF THE INVENTION

A retractable truck bed cover comprising an array of parallel elongated, extruded aluminum slats joined together along their overlapped leading and trailing edges by flexible silicon hinges. The truck bed cover connective hinge slat improves the security of the cover by shielding access to the seam between adjacent slats while enabling stabilization of the silicone hinge joiner strip. Applicant's connective hinge slat is designed to be used in an array of discrete, adjacent slats which are each interconnectedly joined together sequentially through discrete joiner members, the distal ends of which are held fast to slat end caps, forming a continuous slat array suitable for use as a retractable truck bed cover.

Each slat includes a slat surface having a leading edge defined by an inverted step nib and trailing edge defined by an upright step nib. When two slats are placed contiguously with the first slat's leading edge against the second slat's trailing edge, the shape of the inverted step nib and the upright step nib form an over and under half lap splice joint between the first slat and the second slat that provides a redundant structural barrier covering and protecting the seam area disposed between the two adjacent slats. Extending downward from the slat surface, on both the leading edge side and the trailing edge side, are mirror image receptor channels which are adapted to receive and hold the connector section of a hinge joiner member for the entire length of each slat.

Each slat joiner member is a single, flexible body which has a hinge section at its center that is designed to improve the flexibility of the joiner member and is disposed between two mirror image connector sections or bosses which are each sized and shaped to sleeve into and be captured within the receptor channels of opposing slats. Two adjacent slats can thus be joined together at their leading and trailing edges through the connector section on one side of the joiner member being placed in the receptor channel on the leading edge side of the first slat and the connector section on the other side of the same joiner member being placed in the receptor channel on the trailing edge side of the second slat (or vice versa). The joined adjacent slats retain the ability to pivotally hinge through the flexibility of the hinge section of the joiner member and the non-restrictive half lap splice lap joint to allow the truck bed cover to be retracted and extended.

At each end of each discrete slat is a slat end cap independently positioned and engaged to the end of the slat, and secured thereto through the use of a rivet fastener. Each slat end cap is additionally fastened to the end connector section of the joiner member in one receptor channel of the respective slat. Through its engagement to the end of the slat and attachment to the end of the joiner member, the slat end cap provides a means for maintaining the joiner members fixed to the ends of the slat preventing the joiner member from shrinking due to aging or temperature fluctuations and the resultant leaks in the peripheral edges of the slatted cover. The slat end caps also function collectively as the primary bearing surface upon which the cover body assembly is carried within the supporting side tracks.

It is an object of this invention to provide a truck bed cover connective hinge slat which eliminates the exposed seam security vulnerability of conventional connective hinge slats when placed in a slat array.

It is another object of this invention to provide a truck bed cover connective hinge slat which protects the joiner member connecting adjacent slats in an array without requiring a restrictive overlap or interlock between adjacent slats.

It is yet another object of this invention to prevent the contraction or shrinkage of the joiner member connecting adjacent connective hinge slats due to aging or exposure to temperature fluctuations.

It is still another object of this invention to provide a bearing surface beneath an array of connective hinge slats that reduces friction and ensures smooth operation of the slatted cover body within the side support tracks of a retractable truck bed cover assembly.

These and other objects will be apparent to one of skill in the art.

BRIEF DESCRIPTION OF THE DRAWINGS

FIG. 1A is a perspective cut away view of the slat ends.

FIG. 5 is a perspective view of the slat end cap of a truck bed cover slat built in accordance with the present invention.

FIG. 6A is an exploded perspective view of a truck bed cover slat assembly with an extended joiner member and slat end cap built in accordance with the present invention.

FIG. 6B is a top plan view of a truck bed cover slat assembly with an extended joiner member and slat end cap built in accordance with the present invention.

FIG. 6C is a side elevational view of a truck bed cover slat assembly with slat end caps built in accordance with the present invention.

FIG. 6D is a bottom plan view of a truck bed cover slat assembly with slat end cap built in accordance with the present invention.

DETAILED DESCRIPTION OF THE INVENTION

Figure 1:
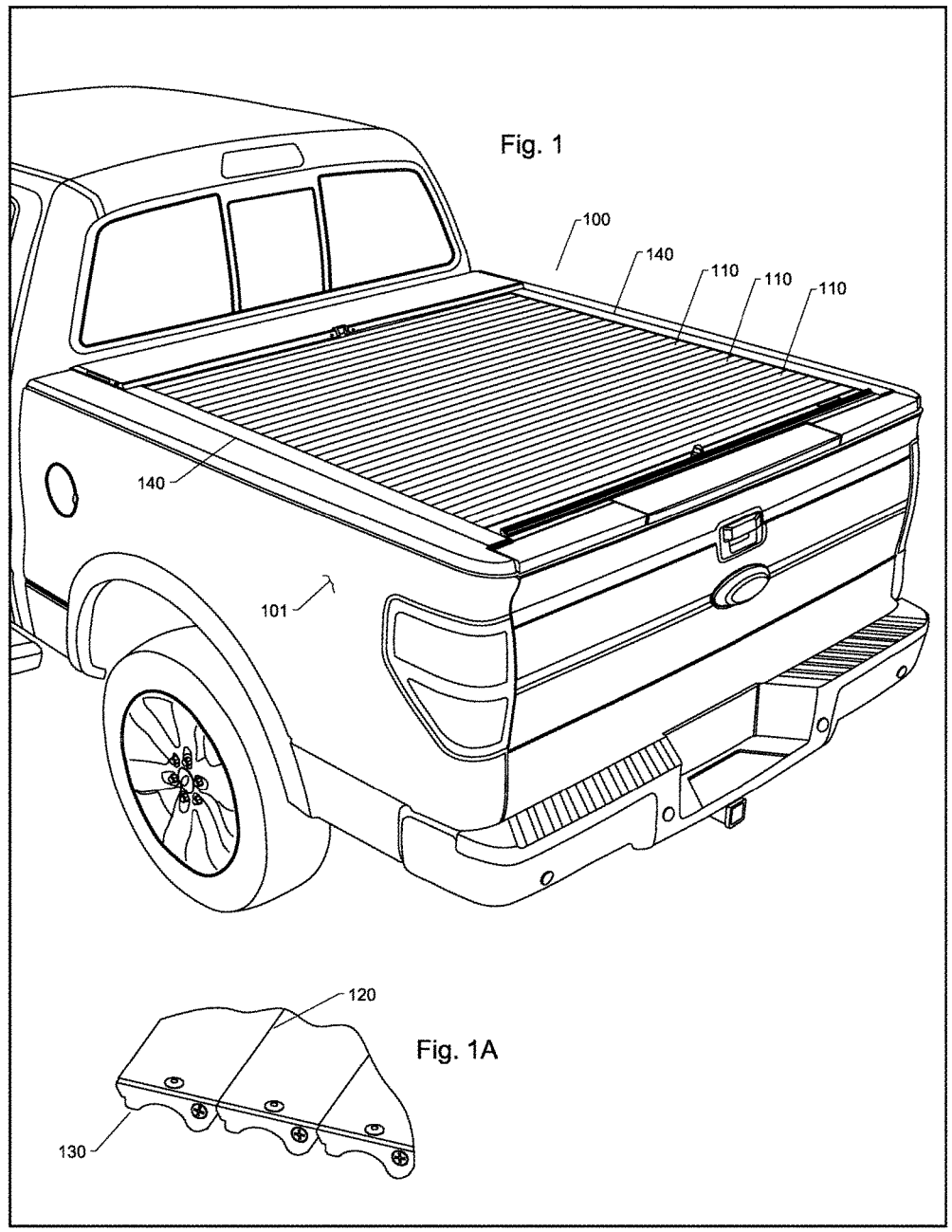
FIG. 1 is a perspective view of a truck bed cover built in accordance with the present invention installed onto a conventional pickup truck utility bed.

Referring now to the drawings and in particular FIG. 1 and FIG. 1A, a retractable truck bed cover 100 in accordance with the present invention is shown having a plurality of parallel slats 110 disposed in a contiguous arrangement and attached together. A connective hinge 120 is disposed between each slat 110, enabling the plurality of slats 110 to form a single slat array which defines the body of the truck bed cover 100. A slat end cap 130 is secured to the end of each discrete slat 110. The roll-up truck bed cover 100 slat array in accordance with the present invention is mounted inside a guide track 140 connected to the side 101 of the pickup truck with the slat end caps 130 providing the primary bearing surface upon which the cover body assembly is carried within the supporting side tracks.

In the preferred embodiment, each slat 110 is a rigid, elongated aluminum extruded strip which is sized to reach from one side of the truck bed to the other laterally. Along each sidewall 101 of the truck bed are mounted a pair of guide tracks 140 that are connected to the truck bed walls 101 as described in Applicant's previous patents cited above. As will be described in more detail below, the body of each slat 110 has integrally formed therein a receptor channel on both the leading and trailing edges that extend for the length of the slat. The receptor channels receive and capture one end of a joiner member, with the other end of the joiner member captured by the opposing receptor channel of the adjacent slat 110, forming the connective hinge 120 which enables the slats 110 to interlock pivotally with the adjacent slats 110 in an edge-to-edge array. Each joiner member extends the entire length of a slat and is fastened to an end cap 130 at each end of slat 110. Each slat additionally includes a slat end cap 130 secured to each slat end which maintains and secures each end of the joiner member in the receptor channel to the end of its respective slat 110 to prevent shrinkage.

Figure 2:
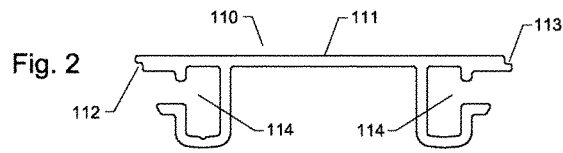
FIG. 2 is a side elevational view of a truck bed cover slat built in accordance with the present invention.

Referring now to FIG. 2, each discrete slat 110 includes slat surface 111 having a leading edge 112 and trailing edge 113. The leading edge 112 is defined by an inverted step nib which forms a first structural barrier to the seam area disposed between two adjacent slats 110 arranged contiguously, edge-to-edge. The trailing edge 113 is defined by an upright step nib which forms a second structural barrier to the seam area disposed between two adjacent slats 110 arranged contiguously, edge-to-edge. When two slats 110 are placed contiguously with the first slat's 110 leading edge 112 against the second slat's 110 trailing edge 113, the shape of the inverted step nib and the shape of the upright step nib form a half lap splice lap joint between the first slat 110 and the second slat 110.

Integral with the slat surface 111, on both the leading edge 112 side and the trailing edge 113 side, are mirror image receptor channels 114 which extend downwardly below the slat surface 111. The mirror image receptor channel 114 on the side of the leading edge 112 includes an open end which faces towards the leading edge 112 and the mirror image receptor channel 114 on the side of the trailing edge 113 and includes an open end which faces towards the leading edge 112. The receptor channels 114 enable the slat 110 to receive and hold a connector section of the joiner member shown in FIG. 3.

Figure 3:
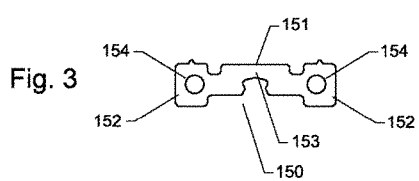
FIG. 3 is a side elevational view of the joiner member of a modified truck bed cover slat built in accordance with the present invention.

Referring now to FIGS. 2 and 3, a joiner member 150 in accordance with the preferred embodiment of the present invention defines a single continuous body constructed out of a flexible material such as silicon and which has a hinge section 151 disposed between two mirror image connector sections 152. Despite the joiner member 150 being constructed out of a flexible material, the hinge section 151 additionally includes a narrowing area 153 to enable greater flexibility to bend and allow hinging movement.

Each connector section 152 is sized and shaped to slide into and be captured within a receptor channel 114 of a slat 110 built in accordance with the present invention. In this regard, a first slat 110 and a second slat 110 can be locked together in a contiguous arrangement that still permits hinging movement between slats when the connector section 152 on one side of the joiner member 150 is held in place in the receptor channel 114 on the leading edge 112 of the first slat 110 and the connector section 152 on the opposite side of the same joiner member 150 is held in place by the trailing edge 113 of the second slat 110. Each connector section 152 additionally includes a retention aperture 154 at its center which runs longitudinally and therefore runs throughout the length of the joiner member 150. The retention aperture 154 is sized to receive an end retention screw that enables a slat end cap to be fastened to joiner member 150.

In the preferred embodiment, the slats 110 are constructed of extruded aluminum and the joiner members 150 are constructed out of extruded silicon. It is additionally contemplated that the surface of the slats 110 may include a powder-coat or anodized finish that improves the overall appearance of the cover body assembly.

Figure 4A:
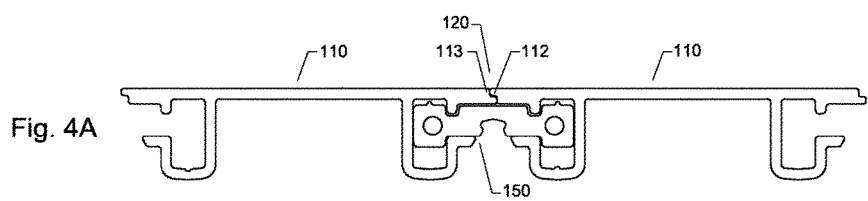
FIG. 4A is a side cross-sectional view of two adjacent truck bed cover slats connected with a joiner member in accordance with the present invention in a flat position which would represent covering a truck bed.

Referring now to FIG. 4A, a first slat 110 and a second slat 110 (collectively, slats 110) are shown locked together by a joiner member 150 and in a flat position, wherein the slats 110 are in the same plane, constituting the covered truck bed position. The first slat 110 is positioned with its trailing edge 113 adjacent to the leading edge 112 of the second slat 110. Together, the trailing edge 113, leading edge 112, and joiner member 150 form the connective hinge of the first slat 110 and the second slat 110. With the first slat 110 and the second slat 110 in the flat position, the half lap splice lap joint remains in a closed position. The closed half lap splice lap joint forms an offset seam, which is operative to prevent any blade or slicing structure from passing through the seam and cutting the joiner member 150. As such, the closed half lap splice lap joint effectively protects the joiner member 150 which connects the adjacent slats 110 and eliminates the exposed seam security vulnerability present in conventional connective hinge slats.

The joiner member 150 includes two retention apertures 154, one at the center of each connector section 152. The retention apertures 154 each run longitudinally through the length of the joiner member 150. The joiner members are cut flush with the ends of the slats and are therefore equal in length to the slats. When slats 110 and joiner members 150 are assembled into a slat array, the ends of each joiner member 150, and accordingly the retention apertures 154 within the connector sections 152 of each joiner member 150, are accessible at the ends of the slats 110. The purpose of the retention apertures 154 is to provide an attachment receptacle to enable each end of joiner members 150 to be secured to the end of the slats and to a molded end fitting, defined as the slat end cap, which is positioned and independently secured to each end of each slat 110 to prevent the joiner member 150 from shrinking and drawing away from the ends of the slats 110.

Figure 4B:
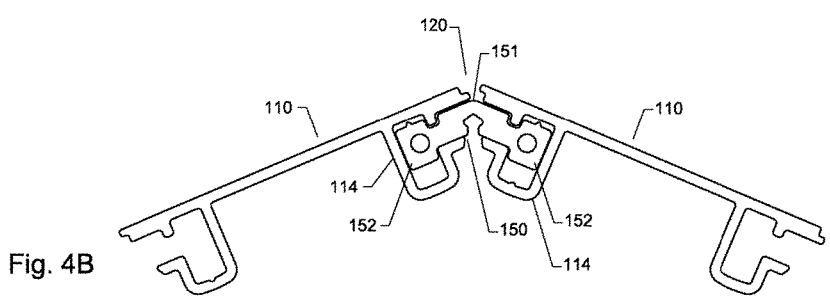
FIG. 4B is a side cross-sectional view of two adjacent truck bed cover slats connected with a joiner member in accordance with the present invention in a rolled up position showing the angular motion permitted with the present hinge joiner member.

Referring now to FIG. 4B, a first slat 110 and a second slat 110 (collectively, slats 110) are shown locked together by a joiner member 150, but pivotally hinged into an acute angle relative to each other. The movement to an acute angle deforms the hinge section 151 of the joiner member 150 as the opposing connector sections 152 are pivotally folded inward relative to and toward one another.

Due to the narrowing of the hinge section 151 and the use of the half lap splice lap joint, the extent of the acute angle in which the slats 110 can be moved is limited only by the eventual contact of the opposing receptor channel 114 of the first slat 110 with the receptor channel 114 of the second slat 110. Indeed, the use of a half lap splice lap joint is specifically contemplated to provide an obstruction for the seam between slats 110 that does not restrict the desired hinged movement. As such, it is understood that the capability to hinge contiguous, adjacent slats 110 into such an acute angle relative to one another enables a truck bed cover in accordance with the present invention (i.e., defined by slats 110 locked together by joiner members 150 into a slat array) to be rolled up in a smaller stored position in a manner similar to my previous patents cited above.

Referring now to FIGS. 5, 6A, 6B, 6C, and 6D, each slat end cap 130 is defined by a molded body having an end flange portion 131 and a tongue flange portion 132 with integral J section 133. The end flange portion 131 of the slat end cap 130 fits at a ninety (90) degree relationship to the slat's 110 longitudinal dimension and includes a countersunk hole 134 through its planar surface which aligns with the retention aperture 154 in the connector section 152 of the joiner member 150 when the tongue flange portion 132 is press-fit into the space between the receptor channels 114 of the slat 110. An end retention screw 136 passes through the countersunk hole 134 and into the retention aperture 154 to secure the joiner member 150 to the slat end cap 130. The tongue flange portion 132 of the molded slat end cap 130 also includes a cap rivet hole 137 in its planar surface, and when the tongue flange 132 is press-fit into the space between the receptor channels 114, the cap rivet hole 137 aligns with a corresponding slat rivet hole 115 in the end of the slat 110. The slat end cap 130 is permanently affixed to the end of the slat 110 by way of a rivet 138 which is passed though both the slat rivet hole 115 and the cap rivet hole 137 when the slat end cap 130 is in place on the end of the slat 110. As the slat end cap 130 is press-fitted into place, it also causes the J section 133 of the tongue flange 132 to align with and sleeve over the end portion of one receptor channel 114 of the slat 110. The bottom surface 139 of the J section 133 is then beneath the receptor channel 114, and being constructed of a specially formulated nylon, enables the J sections 133, one at the end of every slat 110 in the cover body 100 to collectively provide a bearing surface for the underside of the cover body 100 at the points at which the cover body slats 110 engage the supporting side tracks of the retractable truck bed cover assembly 100.

The retractable truck bed cover described herein can be securely locked in place covering the entire truck bed or rolled up in a housing as described in applicants' patent cited above.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cover for a truck bed, the cover comprising:
   a plurality of adjacent slats, each of the plurality of adjacent slats comprising:
   a trailing edge;
   a leading edge being on an opposite side of a width of the slat from the trailing edge;
   an outer planar slat surface;
   an inner planar slat surface;
   a thickness between the outer planar surface of the slat and the inner planar surface of the slat;
   a first step nib on the leading edge of the slat; and
   a second step nib on the trailing edge of the slat, the second step nib configured to mate with the first step nib of an adjacent slat to form a closed joint limiting access from outside when the cover is in a closed extended position;
   wherein the first step nib and the second step nip of each of the plurality of slats are located within the thickness of the slat.

2. The cover of claim 1, further comprising at least one receptor channel extending downwardly from the thickness of each of the plurality of adjacent slats.

3. The cover of claim 2, further comprising a connector section configured to be located within the at least one receptor channel of adjacent slats.

4. The cover of claim 3, wherein the connector section is flexible.

5. The cover of claim 3, wherein each of the plurality of adjacent slats comprise aluminum and the connector section comprises silicon.

6. The cover of claim 3, wherein each of the plurality of adjacent slats comprise a protrusion extending downward from the thickness of the slat which is configured to mate with an upper surface of the connector section.

7. The cover of claim 1, wherein the at least one receptor located on the leading edge of a slat is a mirror image of an at least one receptor located on the trailing edge of an adjacent slat.

8. The cover of claim 1, wherein the first step nib and the second step nip are located fully within the thickness of the slat.

9. The cover of claim 1, wherein the leading edge and the trailing edge of each of said plurality of adjacent slats are configured to form a half lap splice lap joint when the leading edge of a first slat member is connected with the trailing edge of a second slat member.

10. A system for covering a truck bed, the system comprising:
    a pair of guide rails; and
    a plurality of adjacent slats, each of the plurality of adjacent slats comprising:
    a trailing edge;
    a leading edge being on an opposite side of a width of the slat from the trailing edge;
    an outer planar slat surface;
    an inner planar slat surface;
    a thickness between the outer planar surface of the slat and the inner planar surface of the slat;
    a length extending between the plurality of guiderails;
    a first step nib on the leading edge of the slat; and
    a second step nib on the trailing edge of the slat, the second step nib configured to mate with the first step nib of an adjacent slat to form a joint;
    wherein the plurality of adjacent slats are configured to slide within the pair of guide rails; and
    wherein the first nib and the second nip of each of the plurality of slats are located between the outer planar slat surface and the inner planar slat surface of the slat and further comprising at least one receptor channel extending downwardly from the inner surface of each of the plurality of adjacent slats.

11. The system of claim 10, wherein the first step nib and the second step nib overlap at the joint.

12. The cover of claim 10, further comprising a connector section located within the at least one receptor channel of adjacent slats.

13. The cover of claim 12, wherein the connector section is flexible.

14. The cover of claim 12, wherein the plurality of slats comprise aluminum and the connector section comprises silicon.

15. The cover of claim 12, wherein each of the plurality of adjacent slats comprising a protrusion extending into the thickness of the slat and configured to mate with an upper surface of the connector section.

16. The cover of claim 10, wherein the at least one receptor located on the leading edge of a slat is a mirror image of at least one receptor located on the trailing edge of an adjacent slat.

17. The cover of claim 10, wherein the first step nib and the second step nip are located fully within the thickness of the slat.

18. The cover of claim 10, wherein the leading edge and the trailing edge of each of said plurality of adjacent slats are configured to form a half lap splice lap joint when the leading edge of a first slat member is connected with the trailing edge of a second slat member.

* * * * *

UNITED STATES PATENT AND TRADEMARK OFFICE
CERTIFICATE OF CORRECTION

PATENT NO. : 10,137,766 B2
APPLICATION NO. : 15/213180
DATED : November 27, 2018
INVENTOR(S) : Richard Gregory Bernardo et al.

It is certified that error appears in the above-identified patent and that said Letters Patent is hereby corrected as shown below:

In the Claims

Column 8, Claim 12, Line 35, change "cover" to --system--.

Column 8, Claim 13, Line 38, change "cover" to --system--.

Column 8, Claim 14, Line 40, change "cover" to --system--.

Column 8, Claim 15, Line 43, change "cover" to --system--.

Column 8, Claim 16, Line 47, change "cover" to --system--.

Column 8, Claim 17, Line 51, change "cover" to --system--.

Column 8, Claim 18, Line 54, change "cover" to --system--.

Signed and Sealed this
Twenty-sixth Day of March, 2019

Andrei Iancu
*Director of the United States Patent and Trademark Office*